United States Patent
Morita et al.

(10) Patent No.: US 6,784,130 B2
(45) Date of Patent: Aug. 31, 2004

(54) PDP MATERIAL CONTROLLED IN MOISTURE CONTENT

(75) Inventors: Yoshiro Morita, Shiga (JP); Hiroyuki Oshita, Otsu (JP); Masahiko Ouji, Moriyama (JP); Kazuo Hadano, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 125 days.

(21) Appl. No.: 09/950,874

(22) Filed: Sep. 12, 2001

(65) Prior Publication Data

US 2002/0052287 A1 May 2, 2002

(30) Foreign Application Priority Data

Sep. 13, 2000  (JP) ........................................ 2000-278152

(51) Int. Cl.⁷ ........................... C03C 3/064; C03C 4/16; C03C 14/00
(52) U.S. Cl. .............................. 501/75; 501/12; 501/17; 501/32; 501/76
(58) Field of Search ............................... 501/14, 15, 17, 501/32, 75, 76

(56) References Cited

FOREIGN PATENT DOCUMENTS

| JP | 03-285863 | * 12/1991 |
| JP | 10-25121 | * 1/1998 |
| JP | 10-25122 | * 1/1998 |
| JP | 11-209147 | * 8/1999 |

* cited by examiner

*Primary Examiner*—Karl Group
(74) *Attorney, Agent, or Firm*—Collard & Roe, P.C.

(57) ABSTRACT

Inorganic powder as a plasma display panel material comprises a powdery material containing glass powder. The powdery material has a moisture content adjusted to fall within a range between 0.1 and 2 mass %. The powdery material may include the glass powder alone or may further comprise ceramics powder in addition to the glass powder. The inorganic powder may be used as a paste or a green sheet.

5 Claims, No Drawings

PDP MATERIAL CONTROLLED IN MOISTURE CONTENT

BACKGROUND OF THE INVENTION

This invention relates to a plasma display panel material for use in a plasma display panel.

Generally, the plasma display panel comprises a front glass plate and a rear glass plate arranged opposite to each other with a predetermined gap kept therebetween. The front glass plate is provided with a plurality of discharging electrodes formed thereon to perform a plasma discharging operation. A dielectric layer having a thickness of about 30 to 40 µm is formed on the front glass plate to cover the discharging electrodes. The dielectric layer serves to maintain the plasma discharging operation and to protect the discharging electrodes and is required to have a high withstand voltage or breakdown voltage and an excellent transparency.

Similarly, the rear glass plate is provided with a plurality of discharging electrodes for performing a plasma discharging operation and a dielectric layer for maintaining the plasma discharging operation and for protecting the discharging electrodes. Furthermore, a plurality of barrier ribs are formed to define on the discharging electrodes and the dielectric layer a number of gas discharging sections known in the art.

As a method of forming the above-mentioned dielectric layer, use has been made of a technique including the steps of preparing a paste of a dielectric material comprising glass powder or a mixture of glass powder and ceramics powder, applying the paste by printing or batch coating onto the glass plate with the discharging electrodes formed thereon, and firing or baking the paste, a technique including the steps of forming the dielectric material into a green sheet, adhering the green sheet onto the glass plate with the discharging electrodes formed thereon, and firing the green sheet, and so on.

With any existing dielectric material, it is difficult to form a coating film which has a flat surface and a uniform thickness and which includes less bubbles remaining in the film. Therefore, the dielectric layer formed as the coating film after firing often suffers presence of a number of bubbles remaining therein and occurrence of cracks formed therein. In this event, the dielectric layer is not transparent but opaque and dielectric breakdown may be caused to occur. Thus, when the plasma display panel having such dielectric layer is produced, an image formed thereon is not clear but is uneasy to watch. Furthermore, the dielectric layer is often colored yellow as a result of reaction between the dielectric layer and Ag electrodes as the discharging electrodes formed adjacent to the dielectric layer. In this event, the image formed on the plasma display panel is difficult to watch.

In order to obtain the dielectric layer having a flat surface and a uniform thickness, Japanese Unexamined Patent Publication (JP-A) No. H11-209147 proposes a dielectric paste having a moisture content adjusted to 3 wt % or less by controlling a humidity in a paste preparing step. However, this paste does not address to the reaction between the dielectric layer and the Ag electrodes at all.

SUMMARY OF THE INVENTION

It is therefore an object of this invention to provide a plasma display panel material capable of forming a dielectric layer which has a flat surface, a uniform thickness, and an excellent surface condition with less bubbles remaining in the dielectric layer and capable of preventing the dielectric layer from being colored yellow as a result of reaction between the dielectric layer and Ag electrodes.

As a result of extensive studies, the present inventors have found out that water or moisture present on the surface of glass powder or ceramics powder affects the surface condition of a coating film formed as the dielectric layer or the occurrence of yellowish coloring of the dielectric layer by Ag electrodes and that the above-mentioned objects are achieved by controlling the moisture content. Based on the finding, this invention has been made.

According to this invention, there is provided inorganic powder as a plasma display panel material, wherein the inorganic powder comprises a powdery material containing glass powder, the powdery material having a moisture content within a range between 0.1 and 2 mass %.

According to this invention, there is also provided a paste as a plasma display panel material, wherein the paste contains glass powder as an inorganic component, the inorganic component having a moisture content within a range between 0.1 and 2 mass %.

According to this invention, there is provided a green sheet as a plasma display panel material, wherein the green sheet contains glass powder as an inorganic component, the inorganic component having a moisture content within a range between 0.1 and 2 mass %.

In the above-mentioned plasma display panel material such as the inorganic powder, the paste, and the green sheet, the moisture content in the glass powder or a mixture of the glass powder and ceramics powder is adjusted to 2 mass % or less. Therefore, no adverse influence is given to a viscosity characteristic of the paste or a sheet slurry prepared upon forming the green sheet so as to obtain as a dielectric layer a coating film which has a flat surface and a uniform thickness and contains less bubbles remaining in the film. Since the moisture content is adjusted to 0.1 mass % or more (preferably, 0.2 mass % or more), the reaction between the dielectric layer and Ag electrodes can be suppressed.

The mechanism how the above-mentioned reaction is suppressed by the moisture present on the surface of the powder is not clear but is supposed as follows. If no moisture is adsorbed to the surface of the powder, a resin contained in the paste or the sheet slurry is strongly adsorbed to the surface of the powder. In this event, the resin remains unremoved even after completion of a debinding process removing a binder known in the art. This provides a reducing atmosphere in a firing step so that Ag diffused into the dielectric layer from the Ag electrodes is reduced into a colloidal phase to cause yellowish coloring. However, if a predetermined amount of moisture is adsorbed to the surface of the powder as proposed in this invention, the debinding process is promoted so that yellowish coloring of the Ag is hardly caused to occur upon firing. In case where the moisture is present not on the surface of the powder but only in the paste or the sheet slurry, most of the moisture is lost in a drying process of the paste or the green sheet. As a result, the resin is strongly adsorbed to the surface of the powder so that yellowish coloring is easily caused to occur.

In this invention, the moisture content of the glass powder or the mixture of the glass powder and the ceramics powder is measured by the Karl-Fischer tiltration. The Karl-Fischer filtration is a method of measuring the amount of moisture by the use of the Karl-Fischer reagent comprising iodine, sulfur dioxide, pyridine, and methanol and having a nature of quantitatively or stoichiometrically reacting with the moisture. Herein, the amount of moisture released upon heating the powder is measured.

The moisture content may be adjusted by strictly and precisely controlling the moisture during a production process of the glass powder or the ceramics powder. In particular, it is important to control the amount of water added as a promoter upon pulverization of the glass. It is desired to add 0.1 to 2.5 mass % (preferably, 0.2 to 2 mass %) of water is added with respect to the amount of the glass to be pulverized.

DESCRIPTION OF THE PREFERRED EMBODIMENTS

Now, a few embodiments of this invention will be described in detail.

By the use of glass powder as a powdery material, preparation is made of inorganic powder for use in a plasma display panel (PDP). At this time, the moisture content of the powdery material is adjusted to 0.1 to 2 mass %. The powdery material may comprise the glass powder alone or a mixture of the glass powder and ceramics powder.

The inorganic powder thus obtained may be used as a paste or may be formed into a green sheet. Since the moisture content of the powdery material is adjusted to 2 mass % or less, no adverse influence is given to a viscosity characteristic of the paste or a sheet slurry prepared upon forming the green sheet. Therefore, it is possible to obtain a dielectric layer which has a flat surface and a uniform thickness and which contains less bubbles remaining in the layer. Preferably, the moisture content of the powdery material is 1 mass % or less.

On the other hand, since the moisture content of the powdery material is adjusted to 0.1 mass % or more, reaction between the dielectric layer and Ag electrodes is suppressed. Preferably, the moisture content of the powdery material is 0.2 mass % or more.

The glass powder is produced from a glass comprising, by mass percent, 50–75% (preferably, 55–70%) PbO, 2–30% (preferably, 5–25%) $B_2O_3$, 2–35% (preferably, 3–31%) $SiO_2$, and 0–20% (preferably, 0–10%) ZnO+CaO, a glass comprising, by mass percent, 30–55% (preferably, 40–50%) PbO, 10–40 (preferably, 15–35%) $B_2O_3$, 1–15% (preferably, 2–10%) $SiO_2$, 0–30% (preferably, 10–30%) ZnO, and 0–30% (preferably, 3–20%) BaO+CaO+$Bi_2O_3$, a glass comprising, by mass percent, 25–45% (preferably, 30–40%) ZnO, 15–35% (preferably, 20–30%) $Bi_2O_3$, 10–30% (preferably, 17–25%) $B_2O_3$, 0.5–8% (preferably, 3–7%) $SiO_2$, and 8–24% (preferably, 10–20%) CaO+SrO+BaO. Each of these glasses exhibits a good flowability when fired at a temperature between 500 and 600° C. and is excellent and stable in dielectric characteristic. Therefore, the glass powder produced from each of these glasses is adapted to form the dielectric layer having a high withstand voltage.

The ceramics powder may comprise alumina or zirconia. The ceramics powder can be added, for example, up to 10 mass % in order to adjust the flowability, the sinterability, or the coefficient of thermal expansion of the paste.

The ratio between the glass powder and the ceramics powder as an inorganic component is between 100:0 and 65:35 in mass ratio. Thus, the ceramics powder may not be used. If the ceramics powder is used, the ratio of the ceramics powder is adjusted so as not to exceed an upper limit at which the ratio between the glass powder and the ceramics powder is 65:35 in mass ratio. Preferably, the ratio between the glass powder and the ceramics powder falls within a range between 100:0 and 70:30.

The PDP material may be provided in the form of a paste or a green sheet by adding a thermoplastic resin, a plasticizer, and a solvent to the inorganic powder. The PDP material in the form of the paste will be called a PDP paste. Similarly, the PDP material in the form of the green sheet will be called a PDP green sheet.

In case where the PDP material is used as the PDP paste, the thermoplastic resin, the plasticizer, and the solvent are used together with the inorganic powder. The content of the inorganic powder in the PDP paste is 30–90 mass %, preferably, 50–70 mass %.

The thermoplastic resin serves to increase the strength of the paste and to provide the flexibility after the paste is dried. The content of the thermoplastic resin is 0.1–40 mass %, preferably, 1–20 mass %. As the thermoplastic resin, use may be made of poly(butyl methacrylate), polyvinyl butyral, polymethyl methacrylate, polyethyl methacrylate, and ethyl cellulose. Among these substances, a single substance alone or a mixture of two or more substances may be used.

The plasticizer serves to control a drying rate of the paste and to provide the flexibility after the paste is dried. The content of the plasticizer is 0–50 mass %, preferably, 5–30 mass %. As the plasticizer, use may be made or butyl benzyl phthalate, dioctyl phthalate, diisooctyl phthalate, dicapryl phthalate, and dibutyl phthalate. Among these substances, a single substance alone or a mixture of two or more substances may be used.

The solvent is required to prepare the paste from the inorganic powder. The content of the solvent is 5–60 mass %, preferably, 20–50 mass %. As the solvent, use may be made of terpineol, toluene, diethylene glycol monobutyl ether acetate, and 2,2,4-trimethyl-1,3-pentanediol monoisobutyrate. Among these substances, a single substance alone or a mixture of two or more substances may be used.

Next, description will be made of a method of forming, by the use of the above-mentioned paste, the dielectric layer on a front glass plate used in the plasma display panel. The front glass plate is preliminarily provided with a plurality of Ag electrodes. At first, the paste is applied onto the front glass plate by the use of screen printing or batch coating to form a coating film having a thickness of 30–100 μm. Then, the coating film is dried at a temperature within a range between 80 and 120° C. Thereafter, the coating film is fired at a temperature between 500 and 600° C. for 5 to 15 minutes. Thus, the dielectric layer is formed.

In case where the PDP material is used in the form of the green sheet, the thermoplastic resin and the plasticizer are used together with the inorganic powder. The content of the inorganic powder in the green sheet is generally within a range between 60 and 80 mass %.

As the thermoplastic resin and the plasticizer, use may be made of various substances similar to those used in preparing the paste. The ratio of the thermoplastic resin is generally within a range between 5 and 30 mass %. The ratio of the plasticizer is generally within a range between 0 and 10 mass %.

Description will be made of a method of preparing the green sheet. At first, the inorganic powder, the thermoplastic resin, and the plasticizer are individually prepared. To the inorganic powder, the thermoplastic resin, and the plasticizer, a primary solvent such as toluene and an auxiliary solvent such as isopropyl alcohol are added to obtain a sheet slurry. The sheet slurry is applied by the doctor blade method onto a film such as polyethylene terephthalate (PET) and is formed into a sheet. Thereafter, the sheet is dried to remove the solvent. Thus, the green sheet is prepared.

The green sheet is laminated on the glass plate with the Ag electrodes formed thereon, and fired at 500–600° C. for 5–15 minutes to form the dielectric layer. In case of the green sheet, the flatness of the dielectric layer after firing is further improved.

In the meanwhile, a barrier rib material contained in the PDP is required to hardly release a gas which may spoil or deteriorate the discharge characteristic of the PDP. The above-mentioned inorganic powder for the PDP is assumed to be excellent in debinding characteristic as a factor of suppressing yellowish coloring of Ag. Therefore, the PDP material can be used as the barrier rib material in the PDP.

Description will hereinafter be continued in conjunction with specific examples.

At first, preparation was made of three samples Nos. 1, 2, and 3. Each sample was a glass paste obtained by preparing a mixture of 65% glass powder, 5% ethyl cellulose, 15% dibutyl phthalate, and 15% terpineol and kneading the mixture.

The glass powder was prepared as follows. Raw materials were mixed so as to obtain a glass having a composition of 65% PbO, 5% $B_2O_3$, 25% $SiO_2$, and 5% CaO in mass % and a softening point of 590° C. The raw materials were uniformly mixed, put into a platinum crucible, melted at 1250° C. for 2 hours, and shaped into a glass block. Subsequently, the glass block was pulverized with water added as a promoter in amounts of 0 wt %, 0.5 wt %, and 3.0 wt %. After classification, the glass powder was obtained having a particle size distribution such that D50 (50% particle size) is approximately equal to 3 μm.

The moisture content of the glass powder thus obtained was measured by the Karl-Fischer method under the following conditions. As a measuring instrument, use was made of the Karl-Fischer Moisture Titrator MK-AII manufactured by Kyoto Electronics Manufacturing Co., Ltd. As a Karl-Fischer reagent, use was made of HYDRANAL-Composite 1 manufactured by Hayashi Pure Chemical Ind., Ltd. The amount of each sample was 1 g. Each sample was heated at a temperature rising rate of 10° C./min until 600° C. was reached. As a result, the moisture content was equal to 0.05 mass %, 0.61 mass %, and 3.10 mass % for the samples with the water added as the promoter in amounts of 0%, 0.5 mass %, and 3.0 mass %, respectively. It is noted here that the moisture content was greater than the amount of water added as the promoter. Presumably, this is because the moisture in an ambient atmosphere was adsorbed.

Next, the above-mentioned paste was applied by screen printing onto the surface of a soda lime glass plate with the Ag electrodes formed thereon. The paste was fired at 590° C. for 10 minutes to form the dielectric layer having a thickness of about 30 μm. Subsequently, the surface roughness of the dielectric layer thus obtained was measured by a probe-type surface roughness meter. The dielectric layer around the Ag electrodes was visually observed to judge occurrence of coloring.

The surface roughness and the occurrence of coloring for each sample are shown in Table 1. In Table 1, symbols "○" and "×" represent the case where no coloring was observed because the Ag electrodes and the dielectric layer do not react with each other and the case where coloring was caused by the reaction between the Ag electrodes and the dielectric layer.

TABLE 1

|  | Sample No. | | |
| --- | --- | --- | --- |
|  | 1 | 2 | 3 |
| Amount of Water Added upon Pulverization (mass %) | 0.5 | 0 | 3.0 |
| Moisture Content in Glass Powder (mass %) | 0.61 | 0.05 | 3.10 |
| Surface Roughness of Dielectric Layer (μm) | 0.50 | 0.48 | 0.89 |
| No Coloring Caused by Reaction between Dielectric Layer and Ag Electrodes | ○ | X | ○ |

For the sample No. 1 in which the moisture content in the glass powder was 0.61 mass %, the surface roughness Ra of the dielectric layer was 0.50 μm and no coloring of the dielectric layer was observed. For the sample No. 2 in which the moisture content in the glass powder was 0.05 mass %, the surface roughness is sufficient but coloring was observed as a result of reaction between the Ag electrodes and the dielectric layer. For the sample No. 3 in which the moisture content in the glass powder was 3.10 mass %, no coloring of the dielectric layer was observed but the surface roughness was as coarse as 0.89 μm.

From the above, it is understood that the sample No. 1 is suitable as the PDP material.

What is claimed is:

1. A green sheet as a plasma display panel material, wherein said green sheet contains glass powder as an inorganic component, said inorganic component having a moisture content within a range between 0.1 and 2 mass %.

2. A green sheet according to claim 1, wherein said inorganic component comprises said glass powder alone.

3. A green sheet according to claim 1, wherein said inorganic component comprises ceramics powder in addition to said glass powder.

4. A green sheet according to claim 3, wherein the content of said ceramics powder is adjusted so as not to exceed an upper limit at which the ratio between said glass powder and said ceramics powder is 65:35 in mass ratio.

5. A green sheet according to claim 1, wherein said green sheet is a dielectric forming green sheet.

* * * * *